June 21, 1949.    J. W. FORREST    2,474,044
PRISM SYSTEM FOR REFRACTOMETER OF THE ABBE TYPE
Filed Feb. 12, 1947.
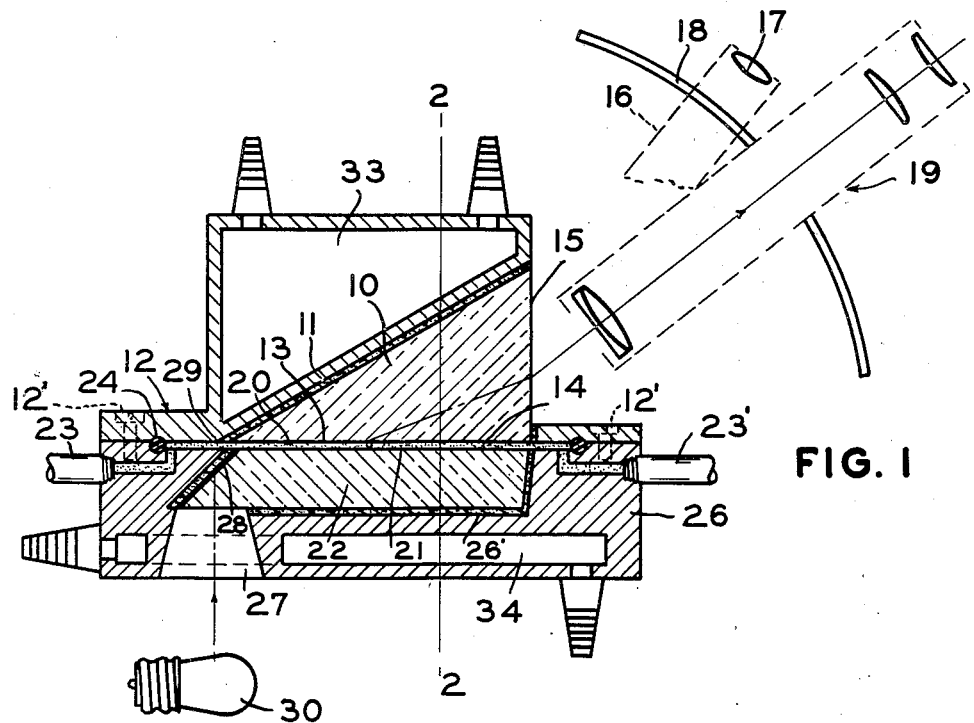
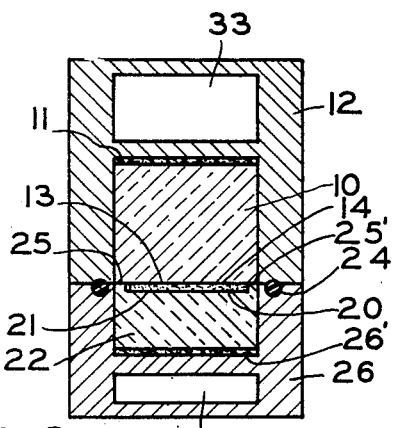
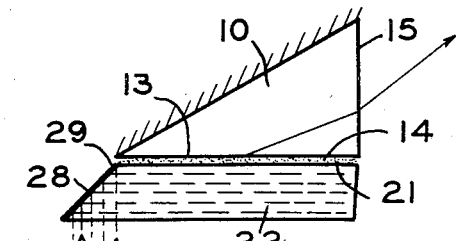
J. W. FORREST
Inventor Patented June 21, 1949

2,474,044

UNITED STATES PATENT OFFICE 2,474,044

PRISM SYSTEM FOR REFRACTOMETER OF THE ABBÉ TYPE

John W. Forrest, Brighton, N. Y., assignor to Bausch & Lomb Optical Company, Rochester, N. Y., a corporation of New York Application February 12, 1947, Serial No. 728,026

5 Claims. (Cl. 88—14)

1

The present invention relates to improvements in refractometers of the critical angle type wherein the refractive index of liquid specimens is determined from the angular position of a dividing line between light and dark portions in the field of the eyepiece. The sharpness of the dividing line is determined largely by the nearness of approach to the critical angle of total reflection at which incident light rays are directed upon the liquid specimen. A serious detriment to the sharpness of the dividing line in certain critical angle refractometers resides in the fact that when measuring the refractive index of liquids, parts of the casing for one of the refractive prisms obstruct light rays of truly grazing incidence, thus making it impossible to determine the real angle of total reflection with precision.

It is an object of this invention to provide in a refractometer means which permits light rays at truly grazing incidence to be projected upon the surface of the liquid specimen whereby the angle of total reflection can be determined with the same precision as in the case of a solid test specimen. Another object is to provide in a refractometer improved means for retaining the liquid specimen in contact with the refracting prism and directing light rays at grazing incidence to the surface of the specimen. A further object is to provide in a refractometer improved means for directing light rays upon a liquid specimen which is being measured.

The objects related above and others will be apparent to those skilled in this art by reference to the following description and accompanying drawing in which:

Fig. 1 is a sectional and partly diagrammatic view of a preferred form of my invention, Fig. 2 is a sectional view taken on the line 2—2 of Fig. 1, Fig. 3 is a diagrammatic view of the light reflective and refractive members comprising the liquid retaining means of my invention.

A preferred embodiment of my invention is shown in Figs. 1-3 of the drawing. It is to be understood that my invention relates to the prism unit and illuminating means associated therewith and that the invention may be used in the Abbé type of refractometer such, for example, as that disclosed in U. S. Patent No. 2,030,841, issued to H. W. Straat. The construction and operation of the Abbé refractometer is well known to those skilled in the art and in Fig. 1 I have shown, diagrammatically, how my invention is used in cooperation with the optical system of the Abbé refractometer. The structure of this type of instrument, which forms no part of the present invention and is well known in the art, embodies an alidade or arm 16 having an axis in common with the prism housing and a magnifier 17, with reticle, mounted on the arm 16 for cooperation with the arcuate scale 18. A telescope 19 is in fixed relation to the scale 18 so that both may turn about the axis of the instrument for measurement of the critical angle in a manner well known in the art.

Instead of the usual prism housing and prism unit embodied in the Abbé type of refractometer, I employ my novel prism unit such as is disclosed in Figs. 1 and 2. In this unit, a light refracting prism 10 is secured by cement 11 within the housing 12. The prism 10 is provided with the polished exit face 15 and the entrance face 13 against which is held the liquid specimen 14 which is being tested.

According to my invention, the liquid specimen 14 is held in a shallow chamber 20 formed by the cooperative relation of the entrance face 13 on one side and an indented or recessed refracting surface 21 on the opposite side extending along the adjacent side of a block 22 of light-transmitting material such as glass. In one successful form of my invention the chamber 20 has a depth of about 0.1 mm. The surface 21, which may be either ground or polished, is substantially parallel to the entrance face 13. If desired, ports 23 and 23' may be provided in the ends of the chamber 20 as shown in Fig. 1 for the circulation of the liquid specimen therethrough and a seal 24 may be inserted between the prism housing 12 and block 22 to prevent leakage of the liquid. The light transmitting block 22 is generally rectangular in form and, as shown in Fig. 2, is provided on either side of chamber 20 with polished contacting surfaces 25 and 25' which engage the entrance face 13. The block 22 is mounted within a housing 26 by means of cement 26'. The adjacent faces of housings 12 and 26 are held firmly together by means of screws 12' so that the liquid 14 is confined within chamber 20.

The salient feature of my invention resides in the means for directing light rays of truly grazing incidence upon the surface of the liquid specimen 14 where it contacts the recessed surface 21. This is accomplished by the inclined silvered surface 28 formed on the end of block 22 in alignment with an opening 27 in housing 26. The mirror surface 28 terminates sharply along the edge 29 at the recessed surface 21 and is disposed at such an angle as to direct light rays from a suitable light source 30 at truly grazing incidence upon the interface between the liquid specimen 14 and the surface 21. Although the reflecting surface 28 is shown disposed at an angle of about 45 degrees to the surface 21, it is obvious that other angular positions of the surface 28 and location of light source 30 could be used, the only requirement being that the light rays must be reflected substantially parallel to surface 21 so that some of the rays will strike the surface 21 at grazing incidence.

In the commonly used Abbé type refractometer of the prior art, the metal mounting parts which hold the prism prevent the light rays from striking the interface, between the liquid specimen and one prism, at a true grazing incidence. By contrast, the illuminating means of my invention shown in Fig. 3 illustrates how light rays incident on the reflecting surface 28 are reflected onto the surface of the liquid specimen 14 through the block 22 at truly grazing incidence and are refracted thereby through the specimen 14 and then through the prism 10 to emerge from the exit face 15 and enter the telescope 19. The operation of a refractometer embodying the present invention is substantially the same as the operation of the well-known Abbé type refractometer.

Provided in the prism housing 12 and block housing 26, respectively, are the fluid chambers 33 and 34 through which a constant temperature fluid may be circulated to control the temperature of the liquid specimen 14 in the usual manner.

It will be seen that there is here provided a refractometer for testing liquids which is capable of measuring the true critical angle of reflection of the light rays incident on the specimen with precision in accordance with the objects stated heretofore. Various modifications can obviously be made without departing from the spirit of my invention as pointed out in the appended claims.

I claim:

1. In a refractometer of the critical angle type for testing liquids comprising, a prism having a light refractive face against which a liquid specimen is held, a light transmitting member having a surface which is parallel to and spaced from said refractive face to provide a space for said liquid specimen, and a reflecting surface formed on said member at an angle to and terminating at said first named surface so as to direct light rays from a light source through said member at grazing incidence to the interface formed by the specimen and said surface so that said rays are refracted through said liquid specimen and prism.

2. In a refractometer of the critical angle type for testing liquids comprising, a prism having a light refractive face against which a liquid specimen is held, a transparent block in contact with said light refractive face and having a recess along the adjacent side which forms together with said light refractive face a retaining chamber for said liquid specimen, said block having a reflecting surface thereon so disposed as to direct light rays from a source at grazing incidence along the recessed side of said chamber upon the surface of said liquid specimen for refraction through said liquid specimen and prism in sequence.

3. In a refractometer of the critical angle type for testing liquids, a light refractive prism having an entrance face in contact with a liquid specimen, a block of light transmitting material having a recessed surface therein spaced from and substantially parallel to said refracting face to form therewith a chamber for retaining said liquid specimen, a reflecting surface at one end of the block, said reflecting surface extending to said recessed surface and being positioned at such an angle thereto that light rays from a light source may be projected at grazing incidence upon the interface formed by the specimen and said surface and be refracted by said specimen and prism in sequence.

4. In a refractometer for testing liquids, the combination of a prism having a refractive face, a light transmitting member having a refractive surface which is spaced from and substantially parallel to said refractive face to provide a space therebetween for holding a liquid specimen, and means for directing light rays at grazing incidence onto the interface formed by the liquid specimen and said surface, said means comprising a reflecting surface formed at one end of said member, said reflecting surface terminating at the refractive surface and being angularly disposed thereto so as to reflect light rays from a light source at grazing incidence onto said interface.

5. In a refractometer for testing liquids, a prism having a polished entrance face, a prism housing, a block of light transmitting material provided with a recessed surface which forms together with said entrance face a shallow chamber for retaining a liquid specimen, a reflecting surface on one end of said block terminating sharply at said recessed surface and so disposed with reference to a light source as to reflect light rays therefrom upon the interface formed by the specimen and recessed surface at grazing incidence to said interface, a housing for said block having an opening therethrough in alignment with said light source and reflecting surface, and means for holding said block housing and prism housing together.

JOHN W. FORREST.

REFERENCES CITED

The following references are of record in the file of this patent:

UNITED STATES PATENTS

| Number | Name | Date |
| --- | --- | --- |
| 1,471,342 | Logan | Oct. 23, 1923 |
| 1,868,908 | Lindley | July 26, 1932 |
| 2,065,114 | Cahn et al. | Dec. 22, 1936 |
| 2,240,988 | Hertel | May 6, 1941 |

FOREIGN PATENTS

| Number | Country | Date |
| --- | --- | --- |
| 469,957 | Germany | Jan. 3, 1929 |